United States Patent Office 3,248,526
Patented Apr. 26, 1966

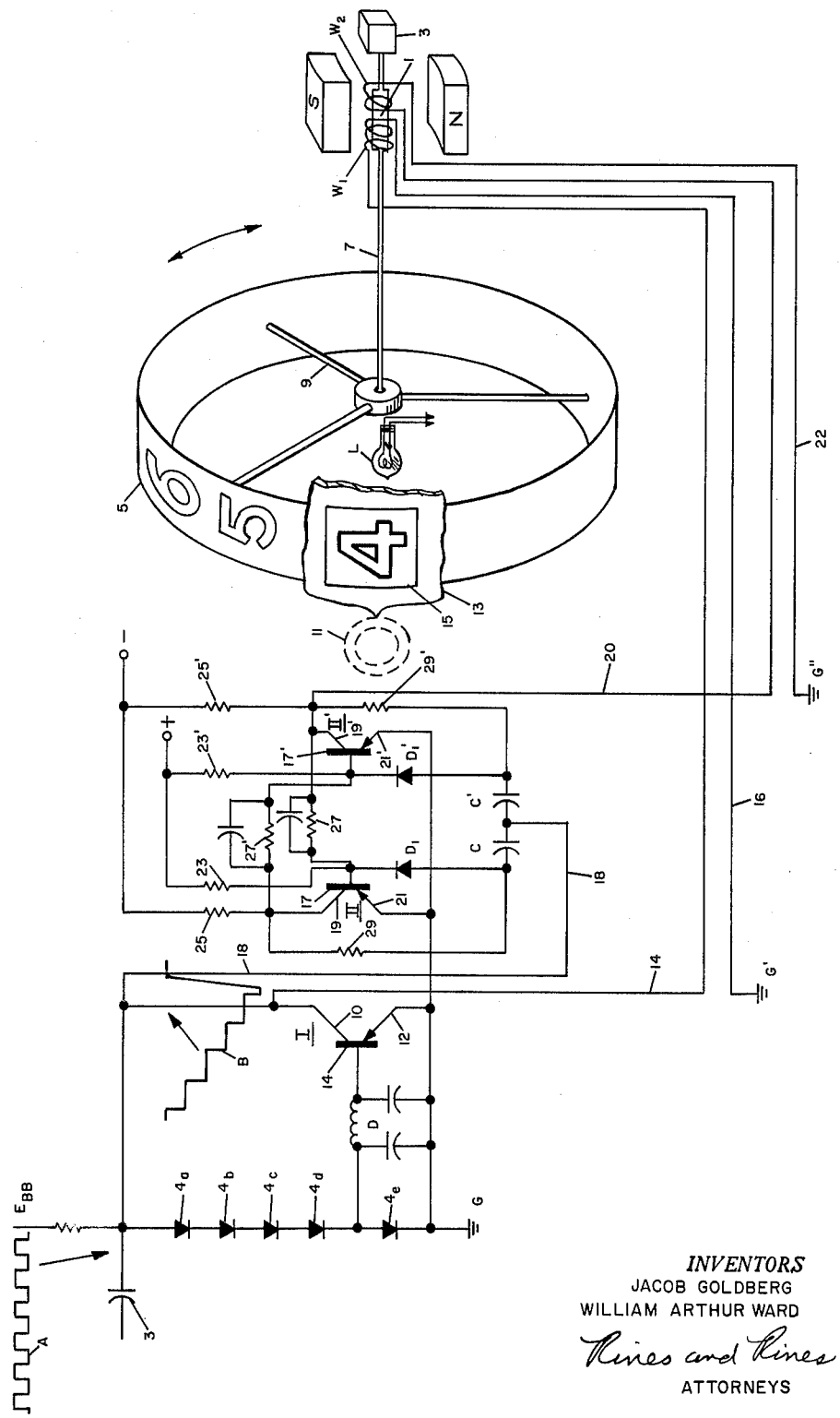

3,248,526
COUNTING-AND-DISPLAY SYSTEM
Jacob Goldberg, 4 Garrity Road, Burlington, Mass., and William Arthur Ward, 71 Deerfield Road, Norwood, Mass.
Filed Aug. 2, 1962, Ser. No. 214,239
17 Claims. (Cl. 235—92)

The present invention relates to counting-and-display systems and, more specifically, to electrical impulse counters requiring numeral displays.

The art is replete with different types of electron-tube and transistor circuits for counting electrical impulses and with various types of numeral displays including so-called Nixie tubes and related devices. As the required counting speed increases, however, it becomes more difficult for the fast-switching counting circuits to operate the displays with accuracy.

A most successful solution of this problem is contained in the copending application of the applicant William Arthur Ward, Method of and System for Electrical Impulse Counting for Use in Digital Voltmeters, Counters and the Like, filed June 27, 1962, and involving a complementary type of logic in which the counting circuits are dynamically interrogated as to the count therein prior to a display period. With such a system, very high-speed chains of switching diode divider counters may be employed for accurate display since this counting logic, unlike present-day counting systems, does not depend upon the order of switching of the diodes (which is erratic) for an accurate count indication or display.

There are some instances, however, where it is desired not to change the type of counting logic and yet it is desired to employ and display the output of high-speed diode-chain switching circuits and the like despite the fact that the order of switching may not be serial or readily ascertainable. A meter display may be used with such circuits, but this requires a reading of, for example, the last digit of a multi-decade count upon a meter scale that inherently does not provide the same numeral appearance as the Nixie tube or other numeral displays of the other decades. It is to this problem that the present invention is primarily, though not exclusively, directed; being concerned with providing a type of display for such last digit, for example, that shall have the same kind of appearance as the numeral display of the other decades, though a meter-movement has been employed to detect that digit.

A further object of the present invention is to provide a novel counter display.

Still an additional object is to provide a new and improved combined counting circuit and display of more general utility, as well.

Other and further objects will be explained hereinafter and will be more particularly pointed out in the appended claims.

In summary, from one of the broad aspects, the invention contemplates a counting-and-display system having, in combination, an impulse-counting circuit, preferably of a diode-chain type, responsive to successive electrical impulses to produce a stair-case waveform comprising corresponding successive discrete energy levels, and an energy-responsive movement means, preferably of the meter type, connected to the impulse-counting circuit to cause the movement means to move to discrete positions corresponding to the successive discrete energy levels. Means carrying a plurality of indicia is also provided, as is means connecting the movement means with the carrying means to move the same past a predetermined region synchronously with the movement of the movement means in order to cause the successive indicia corresponding to the successive electrical impulses to appear at the said predetermined region. Preferred constructional details are hereinafter presented.

The invention will now be described in connection with the accompanying drawing, the single figure of which is a combined schematic circuit diagram and isometric view of a preferred embodiment.

Input electrical pulses, that are to be counted (waveform A) are fed by way of coupling capacitor 3 to the uppermost diode 4a of a series-connected chain of preferably tunnel-type diodes 4a through 4e, such as the type TD3 (General Electric Company), with the diode 4e having the highest peak current so as to be actuated last in the chain. In operation, the diodes 4a through 4e are biased from a constant-current source $E_{BB}$ of magnitude less than the peak currents of the diodes, so that all the diodes are in the low-voltage state. Each positive pulse of the train of successive impulses A causes one of the tunnel diodes 4a, 4b, 4c or 4d to switch to the high-voltage state, and the fifth pulse switches the lowermost diode 4e to turn on an output transistor I through a delay line D connected to the transistor base 14, thus resetting the circuit by substantially grounding the collector 10 of the transistor I. The emitter 12 of the transistor I is shown grounded at G, the term "ground" being employed herein to connote not only actual earthing, but chassis or other reference potential, also. Division by a factor of five, represented by the stair-case waveform B, having successive discrete energy levels or steps corresponding to the successive input impulses A, is thus produced at the collector 10.

Since, as before stated, there is no simple and reliable way of ascertaining the order of switching of the serially connected diodes 4a–4d, a meter-type movement is provided for responding to the successive discrete energy levels of the stair-case waveform B, assuming a different meter-shaft position for each successive discrete level or step, irrespective of the order of switching of the diodes 4a–4d. This meter-type movement is illustrated in the form of an electromagnetic system comprising magnetic pole-pieces S and N between which an armature of shaft 1 is disposed, rotatable in a bearing support 3 in response to current signals applied to one or both windings $W_1$ and $W_2$ associated with the rotatable shaft 1. Other types of meter-like movements may also obviously be employed.

As previously explained, were the conventional types of meter scales to be employed to indicate successive rotational positions of movement of the shaft 1, the digit represented thereby would not be of the same appearance as the numerals of Nixie tube and similar numeral displays. In order to convert the meter indication to a numeral display that is comparable in appearance to, and thus compatible with, Nixie tube and similar numeral displays, thus to provide a uniform display of digits, the shaft 1 is caused synchronously to rotate a light-weight drum 5, as by means of a delicately balanced and appropriately damped shaft extension 7, connected as by a web 9 to the drum 5. The drum 5 itself is shown in the form of an opaque cylinder having translucent or transparent numerals ("4," "5" and "6" of which are shown in the drawing), preferably of the same size as, and similar in appearance to, the numerals of the Nixie tube or other numerical display employed for the other decades, schematically illustrated by the dotted number "0" at 11. The drum 5 may be disposed behind the front panel or other display face 13 of the equipment with a window 15 provided therein in alignment with the line of Nixie tube or other numeral displays 11 of the other decades, so that when a drum number, such as the numeral "4," appears in the region of the window 15, it provides an appearance similar to the other indicated digits, such at the "0" digit shown at 11.

The numeral "4," or whatever numeral appears at the window region 15, may be illuminated by a lamp L disposed behind the window 15 within the drum, out of the path of web 9. The light from the lamp L may be filtered or otherwise made of color corresponding to, for example, the color of the neon or other gas-display numeral 11, further to provide the desired uniformity of display.

The before-mentioned meter winding $W_1$ receives the main discrete-level signals B from the diode-chain five-divider counter by means of conductors 14 and 16, the former of which is connected to the collector 10 and thus to the upper terminal of the chain of diodes, and the latter of which is grounded at G'. Thus, in response to the discrete rotational positions to which the meter-movement shaft 1 is moved by the discrete energy levels or steps of waveform B (in turn corresponding to successive electrical input impulses A), successive numerals "1" through "5" will be displayed at window 15.

After the fifth count, as before stated, output transistor I produces a pulse which is applied by conductor 18 to switch a flip-flop II–II', or other switching circuit. This applies to the other winding $W_2$ of the meter movement, by way of conductors 20 and 22, the latter being grounded at G", a bias signal that keeps the shaft 1 in the "5"-count position, so that the subsequent waveform B will cause the drum 5 to expose numerals "6" through "0," thereby completing the decade. After this second five-count that completes the decade, the flip-flop II–II' is again complemented by the output of transistor I, removing the signal from bias winding $W_2$ and enabling the count to resume from "1" to "5," again; and so on.

In the particular flip-flop switching circuit II–II' that is illustrated, the transistors II and II' are provided with respective bases 17, 17', collectors 19, 19', emitters 21, 21', base-bias resistor supplies 23, 23', and collector bias resistor supplies 25, 25', the emitters being grounded at G. The bases 17 and 17' of the respective stages II and II' are connected to, respectively, the collectors 19' and 19 of the stages II' and II by respective resistance-capacitance coupling circuits 27, 27'. The input to the stages is provided by the conductor 18, through respective coupling capacitors C and C' that, in turn, connect through respective diodes $D_1$ and $D_1'$ to the bases 17 and 17', and through respective resistors 29, 29', to the respective collectors 19 and 19'.

While the drum 5 is illustrated in cylindrical form, clearly disc-type display members operating with in-plane angular-position meter movements and other similar variations are obviously employable. A ten-diode or similar divider may also be employed, obviating the necessity for the switching circuit II–II', though a five-divider is at present more reliable; and other types of divider circuits, including dividers operable for other than decade scales, as well as indicia on the drum 5 other than numerals, may also be employed. Further modifications will also occur to those skilled in the art and all such are considered to fall within the spirit and scope of the invention as defined in the appended claims.

What is claimed is:

1. A counting-and-display system having, in combination, an impulse-counting circuit responsive to successive electrical impulses to produce a stair-case waveform comprising corresponding successive discrete energy levels, electric-energy-responsive movement means connected to the impulse-counting circuit to cause the movement means to move to discrete positions corresponding to the successive discrete energy levels, means carrying a plurality of indicia, and means connecting the movement means with the carrying means to move the same past a predetermined region synchronously with the movement of the movement means in order to cause the successive indicia corresponding to the successive electrical impulses to appear at the said predetermined region.

2. A counting-and-display system having, in combination, an impulse-counting circuit responsive to sucessive electrical impulses to produce a stair-case waveform comprising corresponding successive discrete energy levels, meter-type movement means connected to the impulse-counting circuit to cause the movement means to move to discrete positions corresponding to the successive discrete energy levels, means carrying a plurality of indicia, means connecting the movement means with the carrying means to move the same past a predetermined region synchronously with the movement of the movement means in order to cause the successive indicia corresponding to the successive electrical impulses to appear at the said predetermined region.

3. A counting-and-display system having, in combination, a frequency-divider impulse-counting circuit responsive to successive electrical impulses to produce a stair-case waveform comprising corresponding successive discrete energy levels, electric-energy-responsive movement means connected to the impulse-counting circuit to cause the movement means to move to discrete positions corresponding to the successive discrete energy levels, means carrying a plurality of indicia, and means connecting the movement means with the carrying means to move the same past a predetermined region synchronously with the movement of the movement means in order to cause the successive indicia corresponding to the successive electrical impulses to appear at the said predetermined region.

4. A counter-and-display system having, in combination, an impulse-counting circuit responsive to successive electrical impulses to produce a stair-case waveform comprising corresponding successive discrete energy levels, electric-energy-responsive movement means connected to the impulse-counting circuit to cause the movement means to move to discrete positions corresponding to the successive discrete energy levels, means carrying a plurality of illuminable indicia, means connecting the movement means with the carrying means to move the same past a predetermined region synchronously with the movement of the movement means in order to cause the successive indicia corresponding to the successive electrical impulses to appear at the said predetermined region, and means for illuminating the indicia thus appearing at the said predetermined region.

5. A counting-and-display system having, in combination, a frequency-divider impulse-counting circuit responsive to successive electrical impulses to produce a stair-case waveform comprising corresponding successive discrete energy levels, meter-type movement means connected to the impulse-counting circuit to cause the movement means to move to discrete positions corresponding to the successive discrete energy levels, means carrying a plurality of indicia, and means connecting the movement means with the carrying means to move the same past a predetermined region synchronously with the movement of the movement means in order to cause the successive indicia corresponding to the successive electrical impulses to appear at the said predetermined region.

6. A counting-and-display system having, in combination, an impulse-counting circuit comprising a series-connected chain of switching diodes responsive to successive electrical impulses to produce a stair-case waveform comprising corresponding successive discrete energy levels, electric-energy-responsive movement means connected to the impulse-counting circuit to cause the movement means to move to discrete positions corresponding to the switching of the various diodes of the chain in response to the successive discrete energy levels, means carrying a plurality of indicia, and means connecting the movement means with the carrying means to move the same past a predetermined region synchronously with the movement of the movement means in order to cause the successive indicia corresponding to the successive electrical impulses to appear at the said predetermined region.

7. A counting-and-display system as claimed in claim 6 and in which the said diodes are of the tunnel-diode type, and the said chain of diodes is connected to a substantially constant-current bias source of magnitude less than the peak currents of the diodes in order that the diodes may normally be in their low-voltage state so as to switch to their high-voltage state in response to the said energy levels of the stair-case waveform.

8. A counting-and-display system as claimed in claim 6 and in which one of the diodes of the chain is provided with a higher peak current characteristic than the others in order to be actuated last in the chain.

9. A counting-and-display system as claimed in claim 8 and in which the said one diode is connected through time-delay means to an output transistor for producing an output after all of the diodes of the chain have switched in response to the said waveform.

10. A counting-and-display system as claimed in claim 9 and in which further switching means is provided, connected to the said output transistor for supplying a predetermined bias signal to the movement means to enable subsequent counting by the counting circuit to effect the appearance of different indicia than in the absence of the bias signal.

11. A counting-and-display system as claimed in claim 10 and in which the indicia are numerals and the chain of diodes comprises at least five diodes, the fifth of which is provided with the said higher peak current characteristic than the others in order to be actuated last in the chain.

12. A counting-and-display system as claimed in claim 11 and in which the said predetermined bias signal is sufficient to cause the numerals following a five-count to continue past the said predetermined region to enable a full decade count.

13. A counting-and-display system as claimed in claim 12 and in which the said movement means comprises meter-type electromagnetic means.

14. A counting-and-display system as claimed in claim 13 and in which the meter-type movement means is provided with main and bias windings, the former of which is connected with the diode chain and the latter of which is connected with the said further switching means.

15. A counting-and-display system as claimed in claim 12 and in which the said further switching means comprises a flip-flop circuit connected with the said diode chain.

16. A counting-and-display system as claimed in claim 12 and in which the said numerals are illuminable, and means is provided for illuminating the numerals appearing at the said predetermined region.

17. A counting-and-display system as claimed in claim 1 and in which further counting-circuit-display indicia, similar in appearance to the said plurality of indicia, are provided in line with the said predetermined region.

References Cited by the Examiner

UNITED STATES PATENTS

| | | | |
|---|---|---|---|
| 2,499,316 | 2/1950 | Johnson | 340—379 |
| 2,827,626 | 3/1958 | De Motte | 340—347 |
| 2,860,832 | 11/1958 | Burns | 235—92 |
| 3,089,131 | 5/1963 | Morgan | 340—379 |

MALCOLM A. MORRISON, *Primary Examiner.*